(12) United States Patent
Coburn et al.

(10) Patent No.: US 7,899,299 B2
(45) Date of Patent: Mar. 1, 2011

(54) OVERHEAD CABLE TERMINATION ARRANGEMENT

(75) Inventors: Hutch Coburn, Eden Prairie, MN (US); Mark Smrha, Burnsville, MN (US); Chad Sjodin, Hopkins, MN (US); Craig Fleming, Apple Valley, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/291,332

(22) Filed: Nov. 7, 2008

(65) Prior Publication Data

US 2009/0067803 A1 Mar. 12, 2009

Related U.S. Application Data

(63) Continuation of application No. 11/655,757, filed on Jan. 19, 2007, now Pat. No. 7,463,812.

(51) Int. Cl.
*G02B 6/00* (2006.01)
(52) U.S. Cl. .......................................... 385/137; 385/136
(58) Field of Classification Search .................. 385/136, 385/137
See application file for complete search history.

(56) References Cited

U.S. PATENT DOCUMENTS

| 5,399,814 | A | 3/1995 | Staber et al. |
| 5,872,336 | A | 2/1999 | Long |
| 5,923,753 | A | 7/1999 | Haataja et al. |
| 6,250,816 | B1 * | 6/2001 | Johnston et al. ................ 385/53 |
| 6,356,697 | B1 * | 3/2002 | Braga et al. .................... 385/135 |
| 6,591,051 | B2 | 7/2003 | Solheid et al. |
| RE38,311 | E * | 11/2003 | Wheeler ........................ 385/135 |
| 6,756,539 | B1 | 6/2004 | VanderVelde |
| 6,863,446 | B2 | 3/2005 | Ngo |
| 6,988,716 | B2 * | 1/2006 | Hoffend, Jr. ................... 254/394 |
| 7,295,747 | B2 * | 11/2007 | Solheid et al. ................ 385/135 |
| 7,330,625 | B2 * | 2/2008 | Barth ............................ 385/135 |
| 7,408,769 | B2 * | 8/2008 | Mertesdorf et al. ..... 361/679.32 |
| 7,463,812 | B2 | 12/2008 | Coburn et al. |
| 7,493,002 | B2 | 2/2009 | Coburn et al. |
| 7,583,885 | B2 * | 9/2009 | Kowalczyk et al. .......... 385/135 |
| 2004/0086232 | A1 | 5/2004 | Fujiwara et al. |
| 2004/0086252 | A1 * | 5/2004 | Smith et al. ................... 385/135 |
| 2004/0228599 | A1 | 11/2004 | Haataja et al. |
| 2006/0278426 | A1 * | 12/2006 | Barth ............................ 174/135 |
| 2008/0023212 | A1 | 1/2008 | Larsen et al. |
| 2008/0124038 | A1 * | 5/2008 | Kowalczyk et al. .......... 385/135 |
| 2009/0067803 | A1 * | 3/2009 | Coburn et al. ................. 385/136 |
| 2009/0129045 | A1 * | 5/2009 | Mertesdorf et al. .......... 361/826 |
| 2009/0257726 | A1 * | 10/2009 | Redmann et al. ............. 385/135 |

FOREIGN PATENT DOCUMENTS

| DE | 37 42 448 A1 | 6/1989 |
| DE | 94 18 155 U1 | 2/1995 |
| NL | 7115361 | 5/1973 |

* cited by examiner

*Primary Examiner* — K. Cyrus Kianni
(74) *Attorney, Agent, or Firm* — Merchant & Gould P.C.

(57) ABSTRACT

A system including an overhead cable pathway structure and an adapter panel or cable termination device that mounts overhead to the cable pathway structure. The cable termination device including a plurality of adapters and a cable pathway exit having a curved surface that guides cables exiting from the overhead cable pathway structure to the adapters.

36 Claims, 10 Drawing Sheets

OVERHEAD CABLE TERMINATION ARRANGEMENT

CROSS-REFERENCE TO RELATED APPLICATIONS

This application is a continuation application of U.S. application Ser. No. 11/655,757, filed Jan. 19, 2007 now U.S. Pat. No. 7,463,812; which application is incorporated herein by reference.

FIELD OF THE INVENTION

This disclosure relates to methods and devices for use in the telecommunications industry. More specifically, this disclosure relates to methods and devices for use in managing and organizing telecommunications cables and cable termination components.

BACKGROUND OF THE INVENTION

In the telecommunications industry, effective management and organization of cables and associate cable termination components is necessary in light of the massive cabling schematics involved in providing telecommunication services. Telecommunication facilities, such as data centers or central offices, for example, often have rows of equipment racks and/or equipment cabinets interconnected to cables routed overhead. The cabling schematics of such facilities involve dropping cables down from overhead troughs or ladders, for example, and terminating the cables to termination panels mounted on the racks or in the cabinets.

Space to accommodate the increasing demand for telecommunication services is limited. Improvements are needed in the methods and devices for managing and organizing the systems, cabling schematics, and components associated with providing telecommunication services.

SUMMARY OF THE INVENTION

The present disclosure relates to an overhead cable management system including a cable termination device that mounts to an overhead cable pathway structure. The overhead cable pathway structure can include, for example, a U-shaped trough or a ladder-type structure. The overhead arrangement of the cable termination device allots more space on equipment racks or in equipment cabinets for telecommunication equipment.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
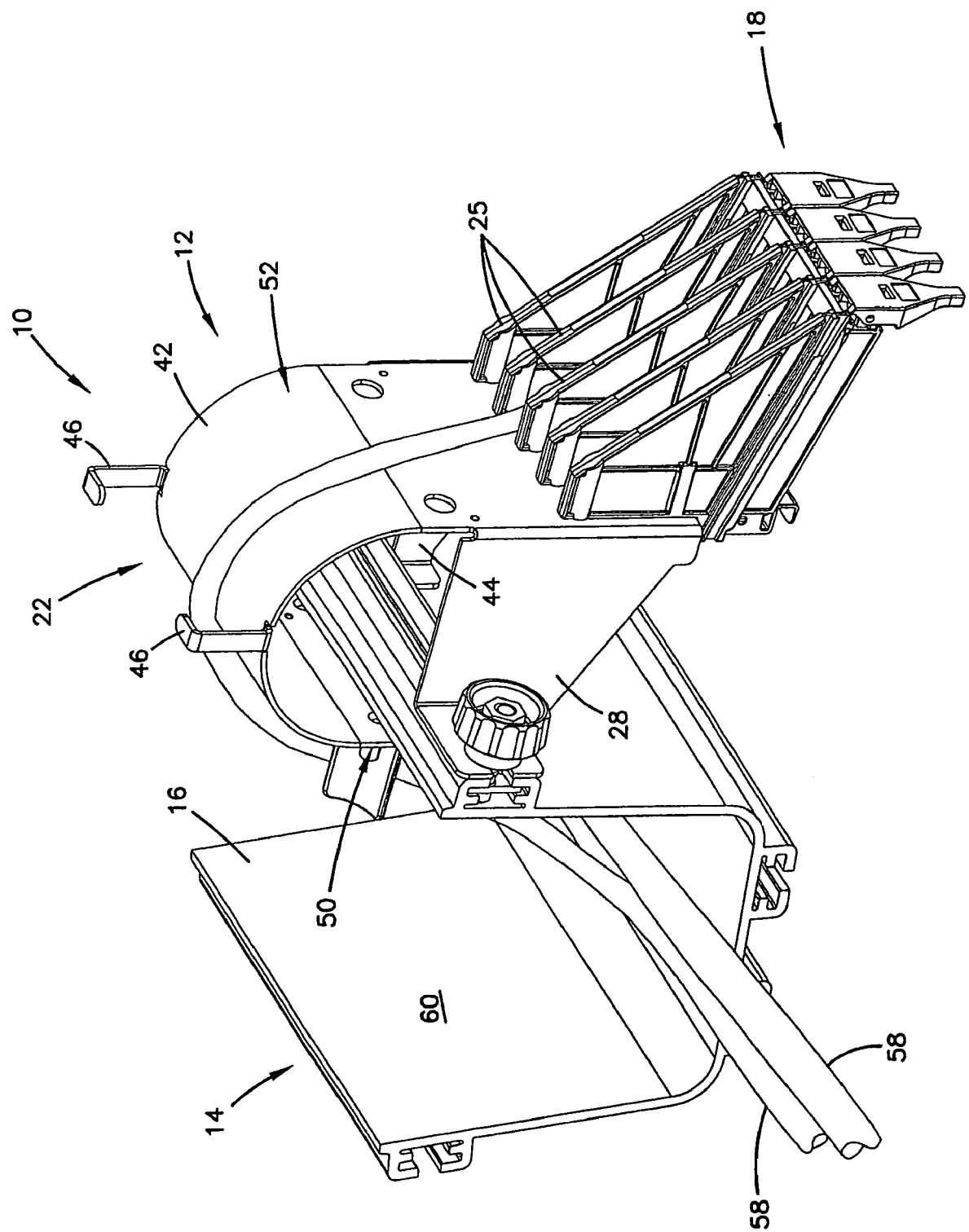
FIG. 1 is a front perspective view of one embodiment of a cable termination device mounted to a cable trough, in accordance with the principles disclosed.

FIG. 1 illustrates one embodiment of an overhead cable management system 10 in accordance with the principles disclosed. The overhead cable management system 10 is designed to manage and organize cables and related components to increase capacity in limited telecommunication facility space. The overhead cable management system 10 of the present disclosure generally includes a cable termination panel or device 12 that mounts to an overhead cable pathway structure 14.

Figure 2:
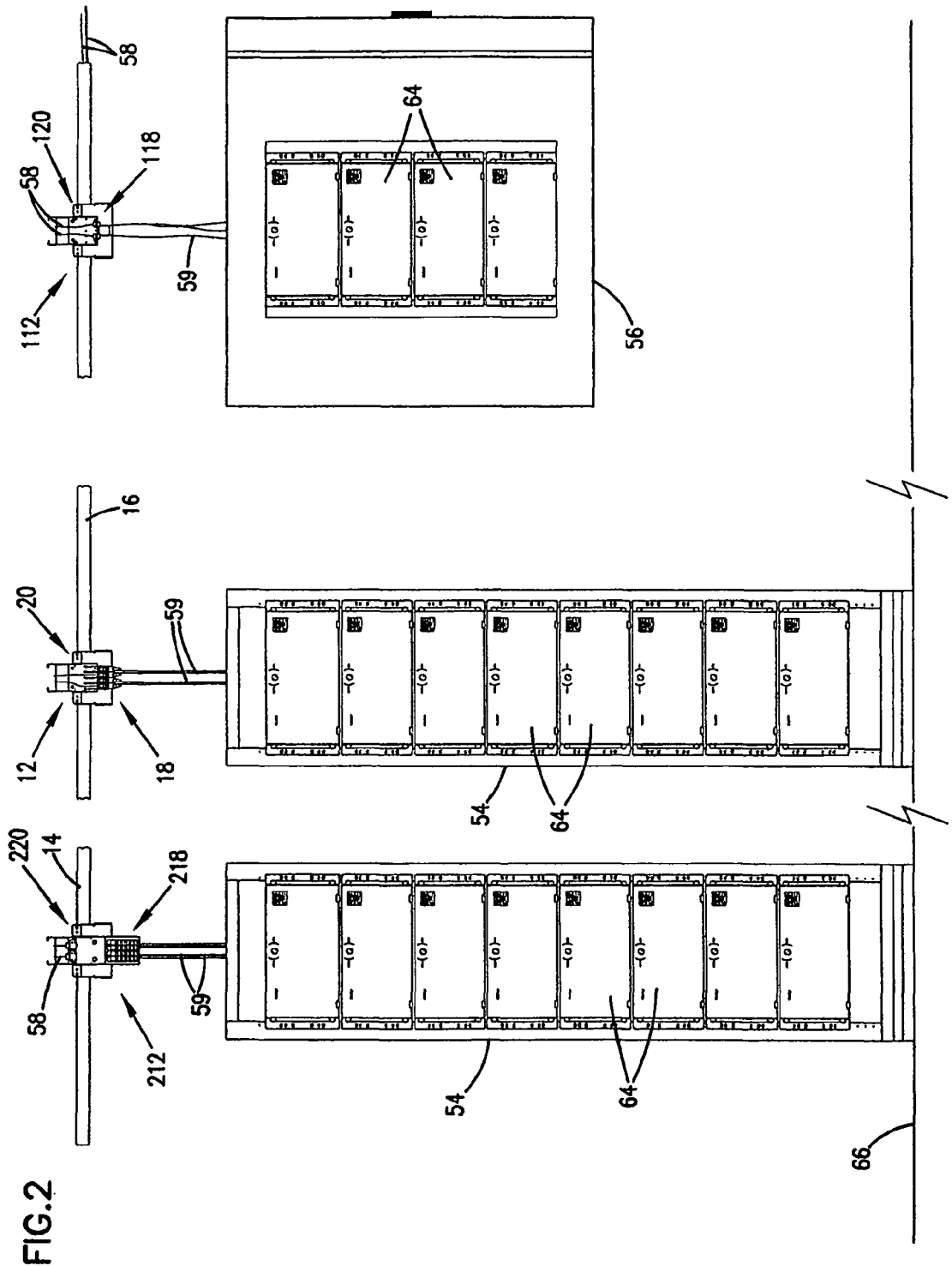
FIG. 2 is a front view of a telecommunications system, including multiple embodiments of cable termination devices mounted to a cable trough, in accordance with the principles disclosed.

Referring to FIG. 2, in telecommunication facilities, such as data centers or central offices, for example, overhead cable pathway structures 14 are hung above racks (e.g. 54), cabinets (e.g., 56), and/or other equipment enclosures or framework. The overhead cable pathway structures 14 carry cables 58 that interconnect to equipment 64 mounted on the racks 54, for example. For purposes of simplification, the remaining description refers to the structure to which the equipment 64 mounts as a "rack;" however, it is to be understood that the present disclose applies similarly to the other equipment structures (e.g., cabinets and other enclosures or framework).

Figure 6:
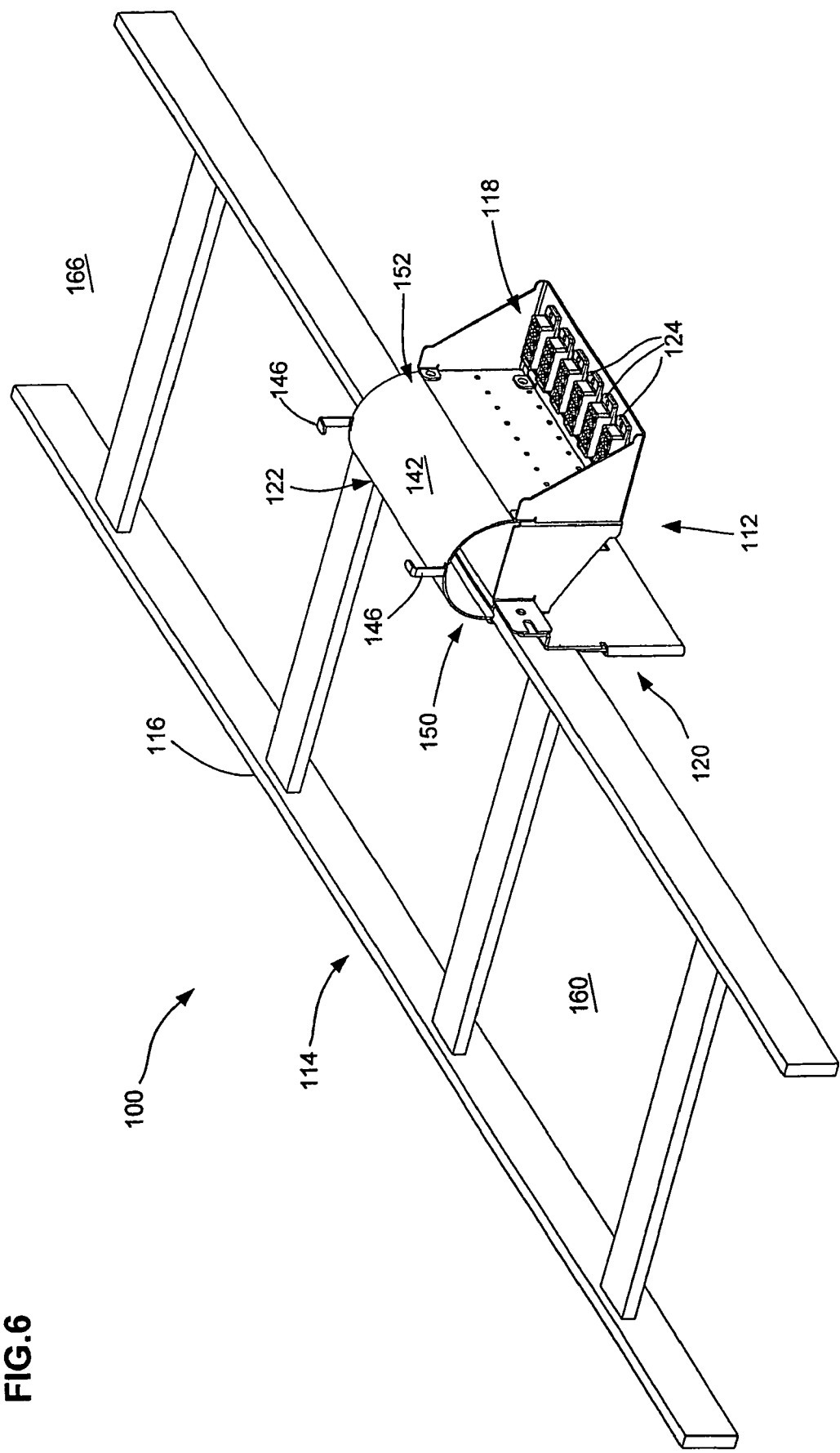
FIG. 6 is a front perspective view of another embodiment of a cable termination device mounted to a cable ladder, in accordance with the principles disclosed.

The "overhead" cable pathway structures are typically run "overhead," as racks commonly have a height equivalent or greater than the height of a technician. It is to be understood that "overhead" is not intended to be limiting to the height of technician, but rather means that the cable pathway structures are located a distance from the floor 66, typically overhead, but more commonly above the structure to which the equipment is mounted (e.g. the rack or cabinet). In the illustrated embodiment of FIGS. 1 and 2, the overhead cable pathway structure is a U-shaped channel or trough 16. In another embodiment, such as is shown in FIG. 6, the overhead cable pathway structure is a ladder-type structure 116. Other types of structures that carry cables overhead to and from racks or cabinets can be used in accordance with the principles disclosed.

In utilizing the space above equipment racks for the "run" of cables, it can be understood that cable pathway structure provides a generally horizontal run for the cables. That is, the cable pathway structures are constructed such that the cables run more horizontally, than vertically, when carried by the cable pathway structure.

In conventional arrangements, cables carried by the overhead cable pathway structures are pulled down from the overhead structure and terminated to a termination panel mounted on the equipment racks. Termination panels are panels to which overhead cables are terminated and generally include a number of adapters or connectors. Jumper cables or patch cords are used to provide interconnections between the termination panel and the equipment mounted on the rack. The racks in conventional facility arrangements hold both the equipment and the termination panel to which the cables terminate, the termination panel occupying at least one of the limited number of unit spaces of the rack.

Referring still to FIG. 2, the overhead cable management system of the present disclosure improves upon the spatial utilization of racks and facilities. That is, the overhead cable management system increases service capacity of a facility by providing cable terminations at a location other than the rack. Cable terminations are instead provided in unoccupied space located above the racks. Valuable rack space can thereby be allocated for more equipment, as opposed to being constrained by the requirement of a termination panel.

In particular, as illustrated in FIGS. 1 and 2, the cable termination devices (e.g. 12, 112, 212) of the present system include a plurality of cable terminations (e.g. 18, 118, 218) to which the overhead cables 58 terminate. The termination devices mount to the overhead pathway structure 14, as opposed to being mounted to a rack (e.g. 54). Cables carried by the overhead cable pathway structure 14 are routed to the cable terminations (18, 218) of the device, and terminated. Jumper cables or patch cords 59 provide interconnections between the termination panels or devices (12, 112, 212) and the equipment 64 mounted on the equipment racks 54.

Figure 4:
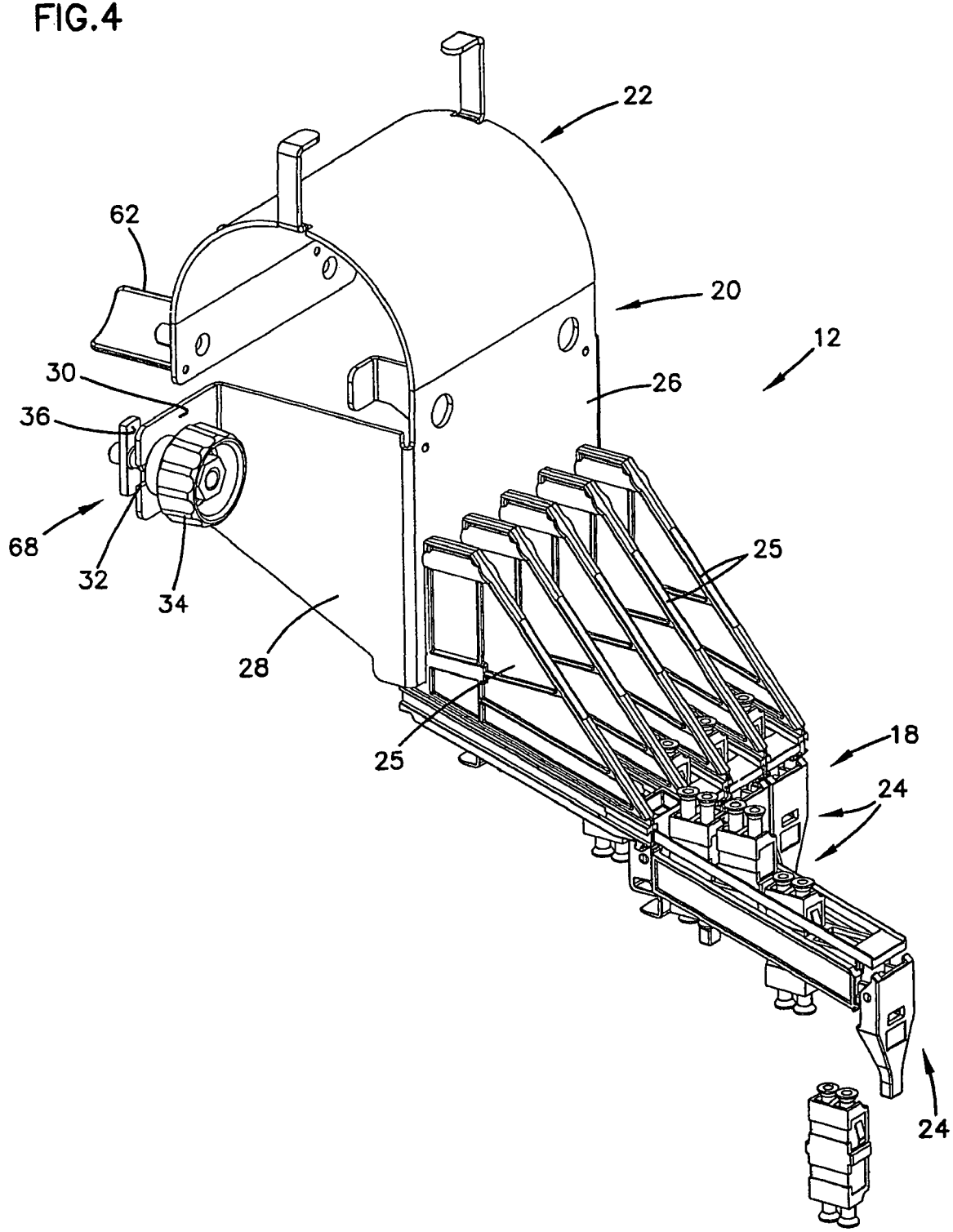
FIG. 4 is a front perspective view of the cable termination device of FIG. 1, shown in isolation.
Figure 5:
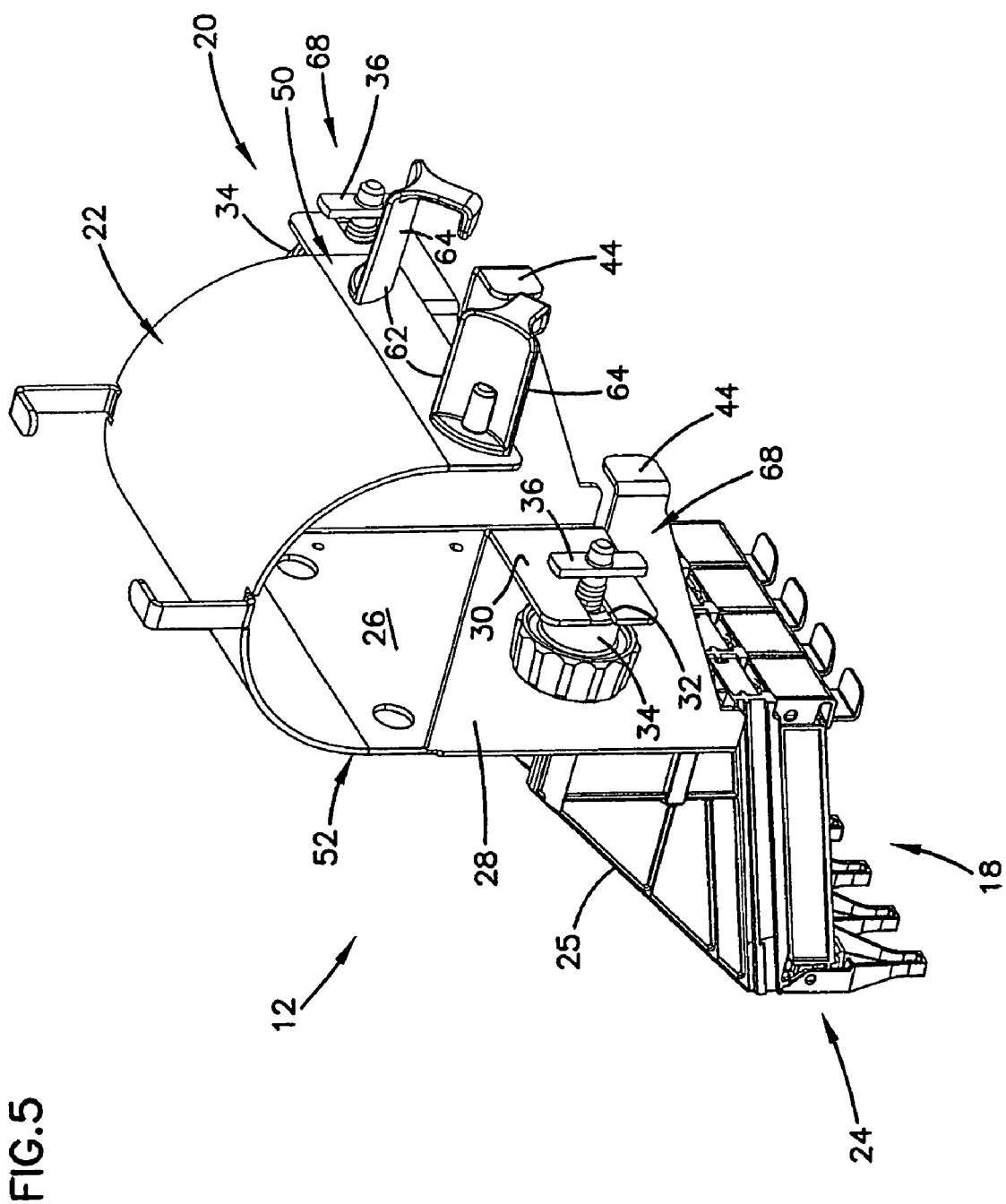
FIG. 5 is a rear perspective view of the cable termination device of FIG. 4.

Referring now to FIGS. 4 and 5, in one embodiment, the cable termination device 12 generally includes the plurality of cable terminations 18 (e.g., adapters or connectors), a mounting bracket 20, and a cable pathway exit 22. In the illustrated embodiment, the plurality of cable terminations 18 are defined by sliding adapters or sliding adapter packs 24 used for the termination of fiber optic cables. The sliding adapter packs 24 include an array of adapters, such as LC, SC, ST or FC type adapters, to which optical fibers terminate.

In some applications, copper cables may be used coextensively with or exclusively from fiber optic cables; and accordingly the cable terminations can include various types of wire terminations or wire connectors. It is to be understood that the principles of the presently disclosed overhead system can be used in fiber optic applications, copper applications, applications having hybrid cabling, or applications having both types of fiber optic and copper cabling.

The sliding adapters 24 of the termination device 12 are mounted to the mounting bracket 20, which mounts the adapters 24 to the overhead cable pathway structure 14. The sliding adapters 24 slide (see FIG. 4) in a direction away from the overhead cable pathway structure 14 to provide termination access to the adapters. Further details of sliding adapters that can be used in the present system are described in U.S. Pat. Nos. 5,497,444 and 6,591,051; which patents are incorporated herein by reference. Divider walls 25 are provided for organizing the separation of cables routed to sliding adapters 24.

Referring still to FIGS. 4 and 5, the mounting bracket 20 of the cable termination device 12 has a bulkhead or mounting plate 26 and bracket arms 28. The cable terminations 18 are secured or mounted to the plate 26. The plate 26 is vertically oriented to correspond to the particular configuration of the cable terminations 18 (i.e., the sliding adapters 24).

The bracket arms 28 extend rearwardly from the mounting plate 26. The bracket arms 28 partly define a mounting arrangement 68 that detachably secures or mounts the device 12 at a selected location along the overhead cable pathway structure 14. Also, the mounting arrangement 68 is designed so that the cable termination device 12 can be selectively mounted at one of many locations along the length of the overhead cable pathway structure 14; and can later be moved if needed.

Figure 3:
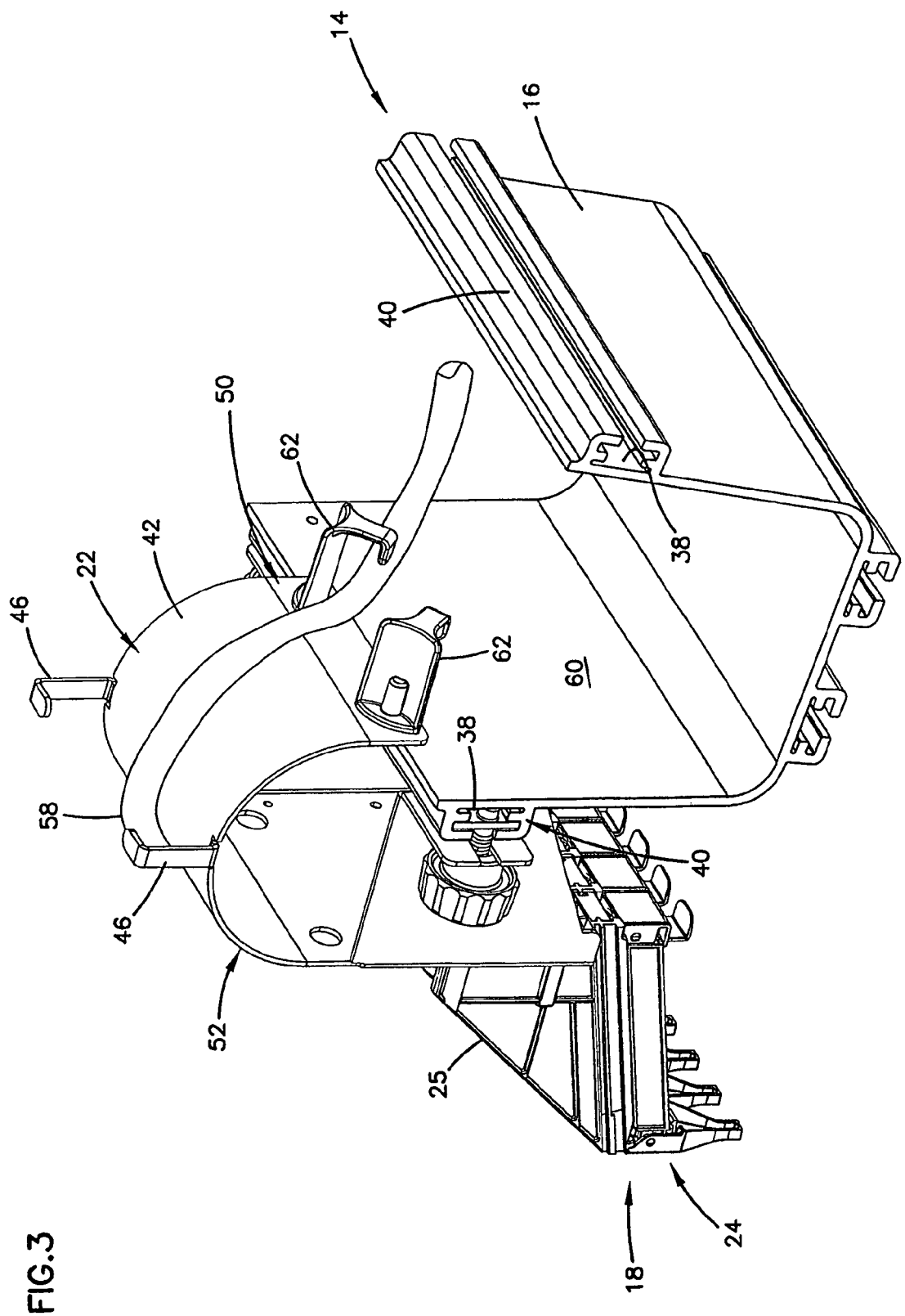
FIG. 3 is a rear perspective view of the cable termination device of FIG. 1.

Still referring to FIGS. 4 and 5, the bracket arms 28 of the mounting bracket 20 each include a flange 30 that defines a slot 32. The slots 32 are sized to receive threaded fasteners 34. The threaded fasteners 34 thread into winged retaining pieces 36. As illustrated in FIG. 3, the winged retaining pieces 36 are sized to fit within a slot 38 formed in mounting structure 40 of the U-shaped cable trough 16. The mounting arrangement 68 (including the winged nut 36 and the slot 38 of the U-shaped cable trough 16) permits the technician to mount the cable termination device 12 in any desired position along the trough 16 relative to the racks 54, as needed (see FIG. 2, for example). Referring to FIG. 5, each of the bracket arms 28 also includes a stabilizing extension 44. As illustrated in FIG. 1, the stabilizing extension 44 rests upon the sidewall of the trough 16 to stabilize the cable termination device 12 when mounted to the trough 16.

Referring back to FIGS. 1 and 3, the cable pathway exit 22 of the termination device 12 generally has an inner portion 50 and an outer portion 52. The inner portion 50 of the cable pathway exit 22 is located within a cable-carrying region 60 of the overhead cable pathway structure 14 when the device 12 is mounted to the structure 14. The outer portion 52 of the cable pathway exit 22 is located outside of the cable-carrying region 60 when the device is mounted to the structure 14. The cable-carrying region 60 is the region in which cables (e.g. 58) lie or run when carried by the overhead cable pathway structure 14. The cable-carrying region 60 of the U-shape trough 16 (FIG. 1), for example, is generally the volume of space defined by the U-shaped trough. Likewise, the cable-carrying region 160 (FIG. 6) of the ladder-type structure 116 is generally the region defined above the footprint of the ladder structure. The cable terminations 18 of the presently disclosed cable termination device 12 are located outside of the cable-carrying region 60, 160 of the overhead cable pathway structure.

Referring still to FIGS. 1 and 3, the inner and outer portions 50, 52 of the cable pathway exit 22 are interconnected by a curved surface 42. The curved surface 42 guides cables exiting from the overhead cable pathway structure 14 toward the plurality of cable terminations 18. Preferably, the curved surface 42 has a radius that prevents the cables from exceeding a minimum bend radius. The cable termination device 12 can further include fingers 46 to retain the cables that are exiting the overhead cable pathway structure 14. The fingers 46 aid to retain the cables within the cable pathway exit 22, and on the curved surface 42 to prevent the cables from exceeding a minimum bend radius. In the illustrated embodiment, the fingers 46 are located at opposite edges of the curved surface 42 of the cable pathway exit 22.

Referring to FIGS. 3 and 5, the cable termination device 12 also includes curved lead-in structures 62 that transition the run of the cables 58 from a first direction to a second perpendicular direction. That is, cables running horizontally within the structure 14 transition about the curved lead-in structures 62 to a perpendicular, vertical run leading toward the cable terminations 18 of the device 12. In the illustrated embodiment of FIG. 3, the cables transition from a horizontal run to a run that goes up and over the sidewall of the U-shaped trough 16.

Still referring to FIG. 5, the curved lead-in structures 62 can include curved guide walls 64. The curved guide walls 64 mount to the inner portion 50 of the cable pathway exit 22; although the guide walls 64 can also be formed integrally with the curved surface 42 of the cable pathway exit 22.

Referring now to FIGS. 6-9, another embodiment of an overhead cable management system 100 is illustrated. Similar to the previous embodiment, this overhead cable management system 100 generally includes a cable termination panel or device 112 that mounts to an overhead cable pathway structure 114 (e.g., the ladder-type structure 116).

Referring to FIG. 6, the cable termination device 112 of the overhead cable management system 100 includes a plurality of cable terminations 118 to which cables (e.g., 58) are terminated, a mounting bracket 120, and a cable pathway exit 122.

In the illustrated embodiment, the plurality of cable terminations 118 are MPO type adapters 124 to which cables having multiple optical fibers (e.g., twelve optical fibers) terminate. As previously discussed, other types of adapters or connectors can be used exclusively or in combination with the MPO adapters 124. The adapters 124 illustrated in FIG. 5 are mounted to the mounting bracket 120, which mounts the adapters 124 to the overhead cable pathway structure 114.

Figure 7:
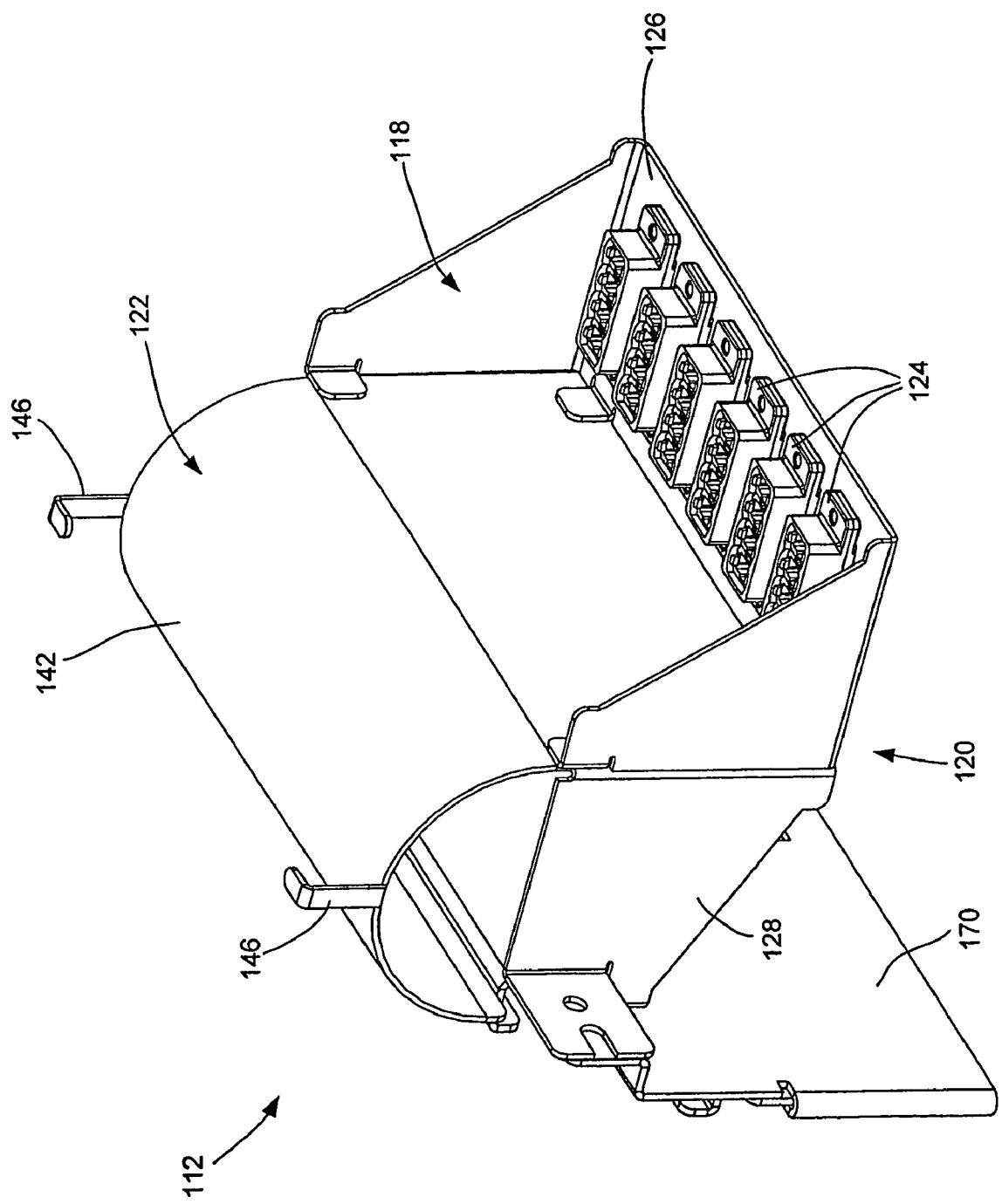
FIG. 7 is a front perspective view of the cable termination device of FIG. 6, shown in isolation.
Figure 8:
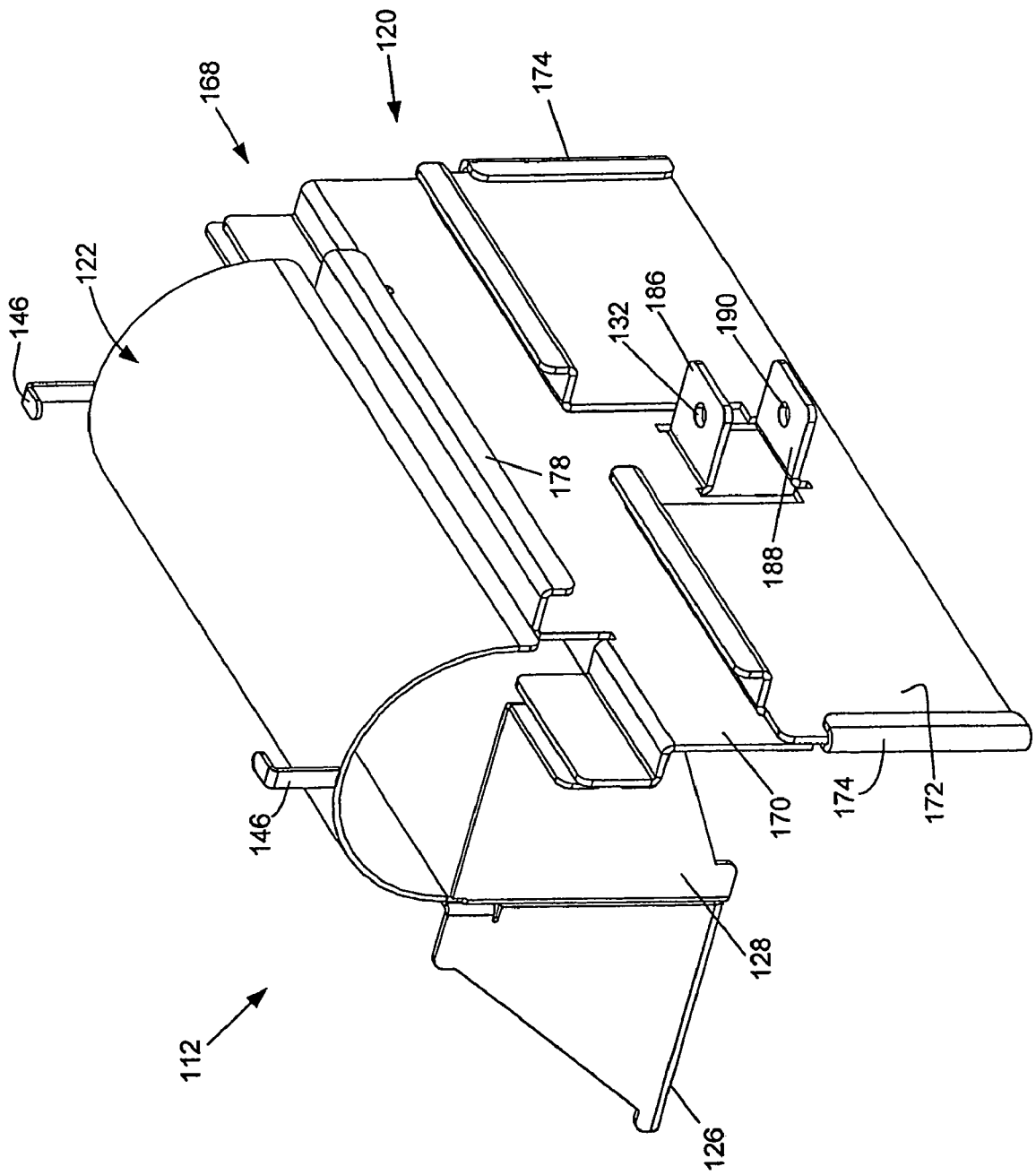
FIG. 8 is a rear perspective view of the cable termination device of FIG. 7.

Referring to FIGS. 7 and 8, the mounting bracket 120 of the cable termination device 112 has a bulkhead or mounting plate 126 and bracket arms 128. The cable terminations 118 are secured or mounted to the plate 126 (e.g., by fasteners threaded through holes 125 (FIG. 9) formed in the plate 126). The plate 126 in this embodiment is horizontally oriented to corresponds to the particular type and configuration of the cable terminations 118 (i.e., MPO adapters 124); however such adapters could alternatively be mounted to a non-horizontal mounting plate.

The bracket arms 128 of the mounting bracket 120 extend rearwardly from the mounting plate 126. The bracket arms 128 are secured to a ladder bracket piece 170 that partly defines a mounting arrangement 168. The bracket arms 128 in this embodiment are the same as that of the previous embodiment for purposes of manufacturing. It can be understood that other bracket arm configurations that secure to a ladder bracket piece can be used in accordance with the principles disclosed. The mounting arrangement 168 of this second embodiment detachably secures or mounts the device 112 at a selected location along the overhead cable pathway structure 114. Also, the mounting arrangement of the device 112 is designed so that the device can be selectively mounted at one of many locations along the length of the overhead cable pathway structure 114; and can later be moved if needed.

Figure 9:
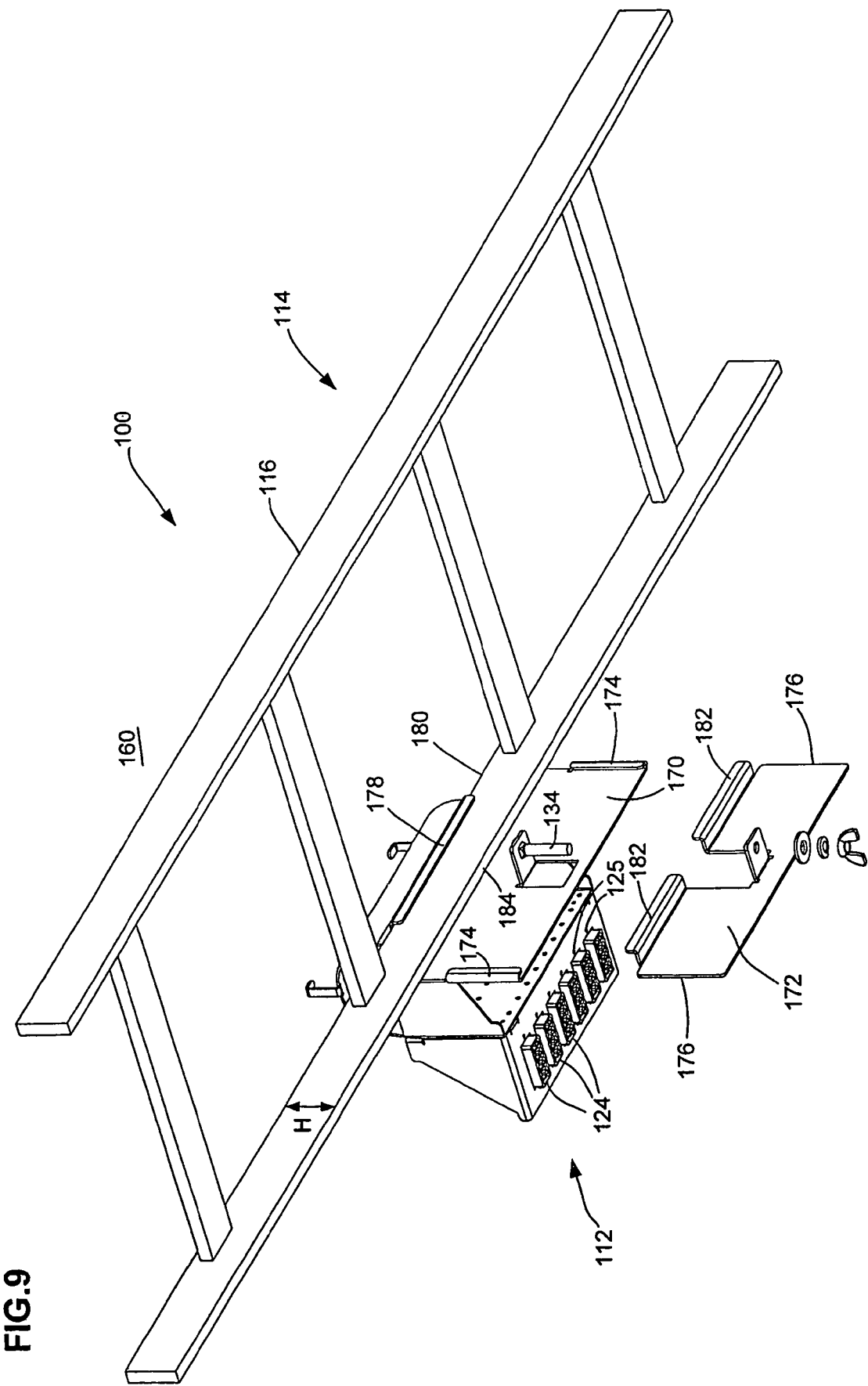
FIG. 9 is an exploded, rear perspective view of the cable termination device of FIG. 6.

Referring now to FIG. 9, the mounting bracket 120 includes the first ladder bracket piece 170 and a corresponding second bracket plate 172. The first bracket piece 170 has a hooked flange 178 that engages, for example, a top edge 180 (FIG. 9) of the ladder structure 116. The second bracket plate 172 has an opposing hooked flange 182 that engages a bottom edge 184 of the ladder structure 116.

The second bracket plate 172 of the mounting bracket 120 is constructed to slide relative to the first bracket piece 170 to engage the overhead cable pathway structure 114 and secure the device 112 at the desired location. In particular, the first bracket piece 170 includes guides 174 located along the side of the bracket piece that receive edges 176 of the second bracket plate 172. The edges 176 of the second bracket plate 172 vertically slide within the guides 174 of the first bracket piece 170 such that the hooked flanges 178, 182 capture and engage the overhead cable pathway structure 114. The sliding mounting arrangement 168 defined by the first bracket piece 170 and the second bracket plate 172 is adjustable to accommodate or match the mounting height configuration (e.g., H, FIG. 9) of more than one type of overhead cable pathway structure.

Referring to FIGS. 8 and 9, each of the first bracket piece 170 and the second sliding bracket plate 172 includes a tab 186, 188 that defines a hole 132, 190 (FIG. 8). The holes 132, 190 are sized to receive a fastener 134 (FIG. 9) that secures the bracket piece 170 and the sliding plate 172 in relation to one another, and in relation to the overhead cable pathway structure 114. In the illustrated embodiment of FIG. 9, the fastener 134 includes a threaded bolt secured in place by a wing nut. Other types of fastening devices can be used to secure the bracket piece 170 and sliding plate 172 in relation to one another.

Referring back to FIG. 7, the cable pathway exit 122 of the device 112 has a curved surface 142 similar to that of the previous embodiment. The curved surface guides cables from the overhead cable pathway structure 114 (FIG. 6) toward the plurality of cable terminations 118. Preferably, the curved surface has a radius that prevents the cables from exceeding a minimum bend radius. Fingers 146 can be provided to retain cables exiting the overhead cable pathway structure 114.

Referring back to FIG. 6, also similar to the previous embodiment, the cable pathway exit 122 generally has an inner portion 150 located within the cable-carrying region 160 of the overhead structure 114 when the device 112 is mounted to the structure 114, and an outer portion 152 located outside of the cable-carrying region 160. The adapters 124 of the device 112 are located outside of the cable-carrying region 160 of the overhead cable pathway structure 114.

Figure 10:
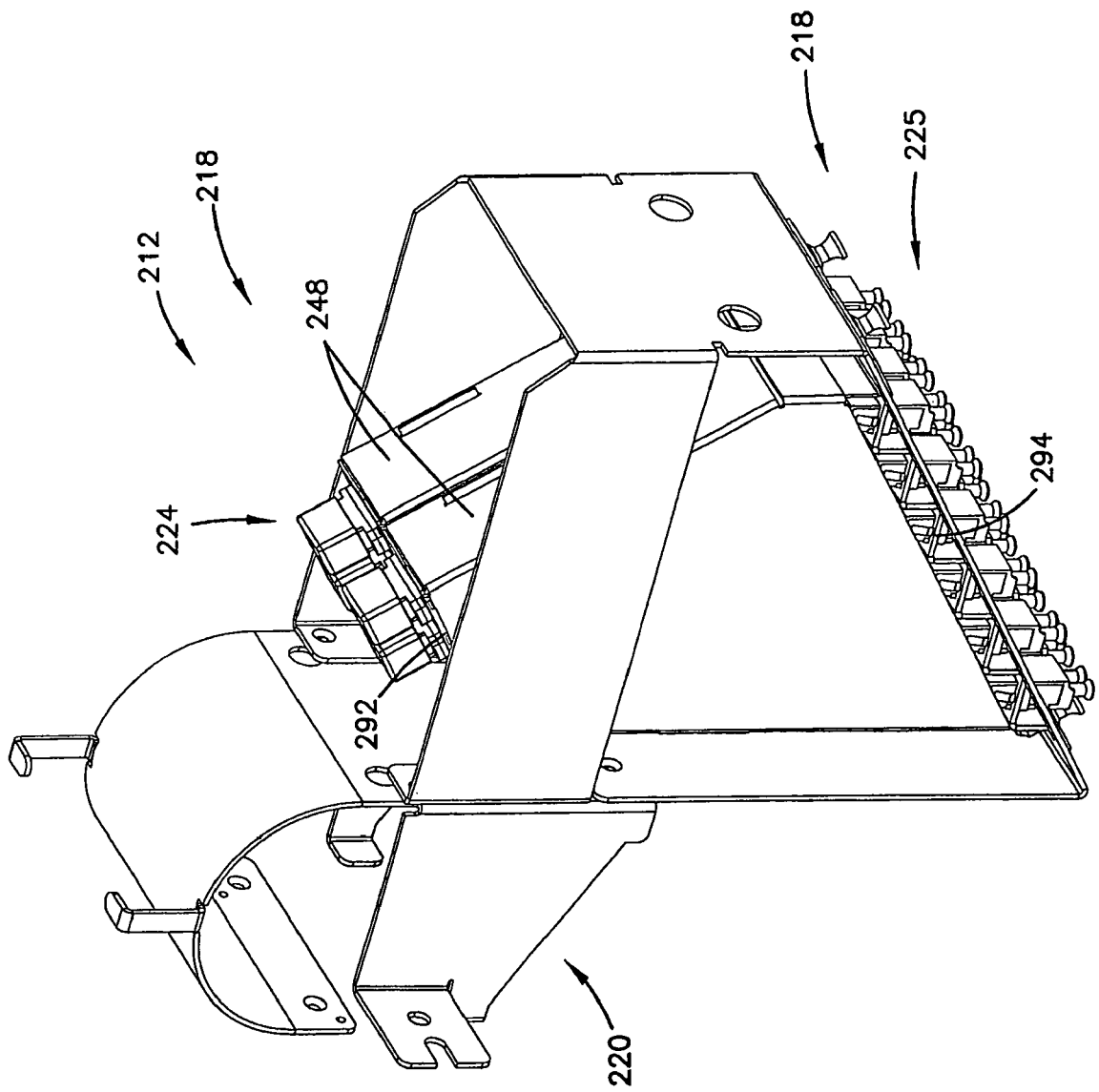
FIG. 10 is a front perspective view of yet another embodiment of a cable termination device, in accordance with the principles disclosed.

Referring now to FIG. 10, yet another embodiment of a cable termination panel or device 212 is illustrated. As shown in FIG. 2, this cable termination device 212 includes mounting structure 220 that mounts to a U-shaped cable trough 16.

Cable terminations 218 of the termination device of FIG. 10 include both MPO type adapters 224 (shown with dust caps) and LC type adapters 225 (shown with dust plugs). The adapters 224, 225 of this device 212 are part of a module 248 that secures to the mounting bracket 220. The MPO type adapters 224 are mounted to a rear wall 292 of the module 248; the LC type adapters 225 are mounted to a corrugated front wall 294 of the module 248. The MPO type adapters 224 are interconnected to the LC type adapters 225 via internal circuitry and/or cables (not shown) contained within the module 248. Further details of an example module 248 are described in U.S. application Ser. No. 11/655,764; which application is incorporated herein by reference. As can be understood, the types of adapters (e.g., 24, 124, 224, 225) and the mounting bracket configuration (e.g. 20, 120) of the devices can be mixed and matched to address the particular needs of an application.

In the alternative, the device 212 of FIG. 10 can be provided with a straight pass-through arrangement wherein only the corrugated front wall 294 of the module is mounted to the mounting bracket 220. The overhead cables 58 terminating to the LC type adapters 225 or other adapter types, as opposed to an intermediate MPO type adapter 224.

The overhead pathway devices (e.g., 12, 112, 212) of the present disclosure minimize the amount of rack space needed in a data center, central office, or other telecommunications facility. Alternatively, the devices allow for expansion and/or upgrade of systems in facilities having spatial constraints, and can be added without having to add racks or cabinets. The devices also are designed to be easily incorporated into existing systems, i.e., mounted to exiting ladder structures, for example, without incurring costs associated with replacing or upgrading existing racks or existing overhead structures.

In addition, the present devices do not interfere with cooling pathways of existing systems. For instance, in conventional methods, expanding the capacity of cabinets often requires the installation of additional termination panels within the cabinets. The added panels can block air flow needed to cool the electrical components inside the cabinet. Because the added panels or devices of the present system are mounted overhead, the panels or devices do not obstruct the air flow passages through the cabinet.

The above specification provides a complete description of the present invention. Since many embodiments of the invention can be made without departing from the spirit and scope of the invention, certain aspects of the invention reside in the claims hereinafter appended.

What is claimed is:

1. An overhead cable management system, comprising:
   a) an overhead U-shaped cable trough; and
   b) a cable termination device mounted to the overhead U-shaped cable trough, the cable termination device including:
      i) a plurality of adapters; and
      ii) a cable pathway exit having a curved surface located above a sidewall of the U-shaped cable trough, the cable pathway exit guiding cables from the overhead U-shaped cable trough to the plurality of adapters.

2. The system of claim 1, wherein the plurality of adapters of the cable termination device include one of LC and SC type adapters.

3. The system of claim 1, wherein the plurality of adapters of the cable termination device include MPO adapters.

4. The system of claim 1, wherein the cable termination device further includes fingers that retain cables exiting from the overhead U-shaped cable trough within the cable pathway exit.

5. The system of claim 4, wherein the fingers are located at opposite edges of the curved surface of the cable pathway exit.

6. The system of claim 1, further including curved lead-in structures that transition the run of cables from a first direction to a second perpendicular direction.

7. The system of claim 6, wherein the curved lead-in structures are defined by curved guide walls.

8. The system of claim 7, wherein the curved guide walls are mounted to the curved surface of the cable pathway exit.

9. The system of claim 1, wherein the cable termination device includes a mounting bracket that detachably mounts the device at a location along the overhead U-shaped cable trough.

10. The system of claim 9, wherein the cable termination device is selectively mounted at one of a number of locations along the overhead U-shaped cable trough.

11. The system of claim 1, wherein the cable pathway exit has an inner portion located within a cable-carrying region of the overhead U-shaped cable trough and an outer portion located outside the cable-carrying region of the overhead U-shaped cable trough.

12. The system of claim 1, wherein the overhead U-shaped cable trough has a cable-carrying region in which cables horizontally run, the adapters of the device being mounted outside of the cable-carrying region of the overhead U-shaped cable trough.

13. An overhead cable management system, comprising:
   a) an overhead cable pathway structure; and
   b) a cable termination device mounted to the overhead cable pathway structure, the cable termination device including:
      i) a plurality of adapters;
      ii) a cable pathway exit having a curved surface leads over a side of the overhead cable pathway structure, the curved surface of the cable pathway exit guiding cables from the overhead cable pathway structure to the plurality of adapters; and
      iii) curved guide walls mounted to the curved surface of the cable exit pathway, the curved guide walls transitioning the run of cables from a first direction to a second perpendicular direction.

14. The system of claim 13, wherein the plurality of adapters of the cable termination device include one of LC and SC type adapters.

15. The system of claim 13, wherein the plurality of adapters of the cable termination device include MPO adapters.

16. The system of claim 13, wherein the cable termination device further includes fingers that retain cables exiting from the overhead cable pathway structure within the cable pathway exit.

17. The system of claim 16, wherein the fingers are located at opposite edges of the curved surface of the cable pathway exit.

18. The system of claim 13, wherein the cable termination device includes a mounting bracket that detachably mounts the device at a location along the overhead cable pathway structure.

19. The system of claim 18, wherein the cable termination device is selectively mounted at one of a number of locations along the overhead cable pathway structure.

20. The system of claim 13, wherein the cable pathway exit has an inner portion located within a cable-carrying region of the overhead cable pathway structure and an outer portion located outside the cable-carrying region of the overhead cable pathway structure.

21. The system of claim 13, wherein the overhead cable pathway structure includes a U-shaped cable trough.

22. The system of claim 13, wherein the overhead cable pathway structure has a cable-carrying region in which cables horizontally run, the adapters of the device being mounted outside of the cable-carrying region of the overhead cable pathway structure.

23. An overhead cable management system, comprising:
   a) an overhead cable pathway structure; and
   b) a cable termination device mounted to the overhead cable pathway structure, the cable termination device including:
      i) a plurality of adapters; and
      ii) a curved cable pathway exit that guides cables from the overhead cable pathway structure to the plurality of adapters, the curved cable pathway exit having an inner portion located within a cable-carrying region of the overhead cable pathway structure and an outer portion located outside the cable-carrying region of the overhead cable pathway structure.

24. The system of claim 23, wherein the plurality of adapters of the cable termination device include one of LC and SC type adapters.

25. The system of claim 23, wherein the plurality of adapters of the cable termination device include MPO adapters.

26. The system of claim 23, wherein the cable termination device further includes fingers that retain cables exiting from the overhead cable pathway structure within the cable pathway exit.

27. The system of claim 26, wherein the fingers are located at opposite edges of the curved surface of a cable pathway exit.

28. The system of claim 23, further including curved lead-in structures that transition the run of cables from a first direction to a second perpendicular direction.

29. The system of claim 28, wherein the curved lead-in structures are defined by curved guide walls.

30. The system of claim 29, wherein the curved guide walls are mounted to a curved surface of the cable pathway exit.

31. The system of claim 23, wherein the cable termination device includes an adjustable mounting bracket that vertically slides to match a mounting height configuration of the cable pathway structure.

32. The system of claim 23, wherein the cable termination device includes a mounting bracket that detachably mounts the device at a location along the overhead cable pathway structure.

33. The system of claim 32, wherein the cable termination device is selectively mounted at one of a number of locations along the overhead cable pathway structure.

34. The system of claim 23, wherein the overhead cable pathway structure includes a U-shaped cable trough.

35. The system of claim 23, wherein the overhead cable pathway structure includes a cable ladder structure.

36. The system of claim 23, wherein cables run horizontally within the cable-carrying region of the overhead cable pathway structure, the adapters of the device being mounted outside of the cable-carrying region of the overhead cable pathway structure.

* * * * *

UNITED STATES PATENT AND TRADEMARK OFFICE
CERTIFICATE OF CORRECTION

| | | |
|---|---|---|
| PATENT NO. | : 7,899,299 B2 | |
| APPLICATION NO. | : 12/291332 | |
| DATED | : March 1, 2011 | |
| INVENTOR(S) | : Coburn et al. | |

It is certified that error appears in the above-identified patent and that said Letters Patent is hereby corrected as shown below:

Col. 8, line 11, claim 13: "surface leads" should read --surface that leads--

Col. 9, line 12, claim 27: "edges of the curved surface" should read --edges of a curved surface--

Signed and Sealed this
Sixth Day of December, 2011

David J. Kappos
*Director of the United States Patent and Trademark Office*